United States Patent [19]

Sekiguchi et al.

[11] Patent Number: 5,432,765
[45] Date of Patent: Jul. 11, 1995

[54] OPTICAL RECORDING APPARATUS FOR RECORDING AUXILIARY SIGNALS USED FOR FOCUS CONTROL

[75] Inventors: Toru Sekiguchi; Yoshihiro Sasaki, both of Tokyo, Japan

[73] Assignee: NEC Corporation, Tokyo, Japan

[21] Appl. No.: 56,789

[22] Filed: May 4, 1993

Related U.S. Application Data

[62] Division of Ser. No. 753,137, Aug. 30, 1991, Pat. No. 5,253,241.

[30] Foreign Application Priority Data

Aug. 30, 1990 [JP] Japan ................................. 2-229759
Oct. 25, 1990 [JP] Japan ................................. 2-289709

[51] Int. Cl.⁶ ............................................. G11B 7/095
[52] U.S. Cl. ............................. 369/44.34; 369/44.32; 369/50; 369/54
[58] Field of Search ............ 369/44.29, 44.32, 44.25, 369/44.29, 44.35, 44.36, 44.27, 44.26, 44.34, 54, 50, 44.39; 250/201.5, 124

[56] References Cited

U.S. PATENT DOCUMENTS

4,907,212  3/1990  Pharris et al. ................. 369/54 X
5,164,932 11/1992  Fennema et al. ........... 369/44.32 X
5,251,194 10/1993  Yoshimoto et al. ......... 369/44.29 X

*Primary Examiner*—W. R. Young
*Assistant Examiner*—Thang V. Tran
*Attorney, Agent, or Firm*—Sughrue, Mion, Zinn, Macpeak & Seas

[57] ABSTRACT

An optical recording apparatus for automatically compensating for focus offset which cannot be compensated for with a conventional focus servo circuit. A plurality of auxiliary signals differing from one another in the frequency domain is generated, a rotational synchronism signal is generated by detecting an index mark put on the optical disk in advance to indicate the reference point of the rotational phase, and a switching signal is generated in response to the rotational synchronism signal. In response to the switching signal, a plurality of auxiliary signals and an information signal are consecutively outputted and recorded onto a track of the optical disk.

4 Claims, 9 Drawing Sheets

OPTICAL RECORDING APPARATUS FOR RECORDING AUXILIARY SIGNALS USED FOR FOCUS CONTROL

This is a divisional of application Ser. No. 07/753,137 filed Aug. 30, 1991 now U.S. Pat. No. 5,253,241.

BACKGROUND OF THE INVENTION

The present invention relates to an optical recording-/reproducing apparatus for recording and reproducing an information signal by emitting a laser beam onto an optical disk medium, and more particularly to a novel optical recording/reproducing apparatus equipped with an automatic focus offset compensator.

An optical recording/reproducing apparatus records and reproduces information by means of an optical head which emits a laser beam onto an optical disk, such as an optomagnetic disk, and involves a tracking servo circuit for enabling the laser beam to properly trace a recording track on the disk and a focus servo circuit for accurately focusing the laser beam on a recording medium face of the disk.

A conventional focus servo circuit utilizing a conventional focus error detecting method such as the knife edge method has a drawback that the compensating range of the focus servo is usually very narrow, only between ± tens of microns. Therefore, according to a prior art optical recording/reproducing apparatus, since the offset of the focusing position is substantially varied over the compensating range of the conventional focus servo circuit by an excessive change of temperature or humidity or by mechanical vibration, compensation due to the offset may be impossible. This might invite a deterioration in the error rate of a reproduced signal and further make it impossible for the tracking servo to trace the track.

SUMMARY OF THE INVENTION

An object of the present invention, therefore, is to provide an optical recording/reproducing apparatus capable of automatically compensating for focus offset which cannot be compensated for with a conventional focus servo circuit.

According to the invention, there is provided an optical recording apparatus for recording an information signal by emitting a laser beam onto an optical disk comprising: means for generating a plurality of auxiliary signals differing from one another in a frequency domain; means for generating a rotational synchronism signal by detecting an index mark put on the optical disk in advance to indicate the reference point of the rotational phase; switching signal generating means for generating a switching signal in response to the rotational synchronism signal; switching means for consecutively switching and successively outputting the plurality of auxiliary signals and the information signal in response to the switching signal; and means for recording the output of the switching means on the optical disk, wherein the switching signal generating means generates the switching signal such that the switching means consecutively output, after the lapse of a predetermined time period from the receipt of the rotational synchronism signal, the plurality of auxiliary signals each for a certain time period, followed by the outputting of the information signal.

According to the invention, there is also provided an optical disk on which a plurality of auxiliary signals are recorded in a prescribed range of rotational angle from a position following a rotation by a prescribed angle with reference to an index mark.

According to the invention, there is further provided an optical reproducing apparatus for emitting a laser beam onto an optical disk and reading an information signal on the basis of the resultant reflected beam from the optical reproduction disk, comprising: the optical disk on which a plurality of auxiliary signals differing from one another in frequency component are recorded; means for converging the laser beam onto the optical disk; means for shifting the laser beam converging means in the axial direction of the laser beam; means for detecting the amplitude of each of the plural auxiliary signals reproduced from the optical disk; and a control circuit for supplying a control signal to the shifting means such that the amplitudes of the reproduced auxiliary signals become in a predetermined relationship, for example, become substantially equal to each other.

DETAILED DESCRIPTION OF THE PREFERRED EMBODIMENT

Figure 1:
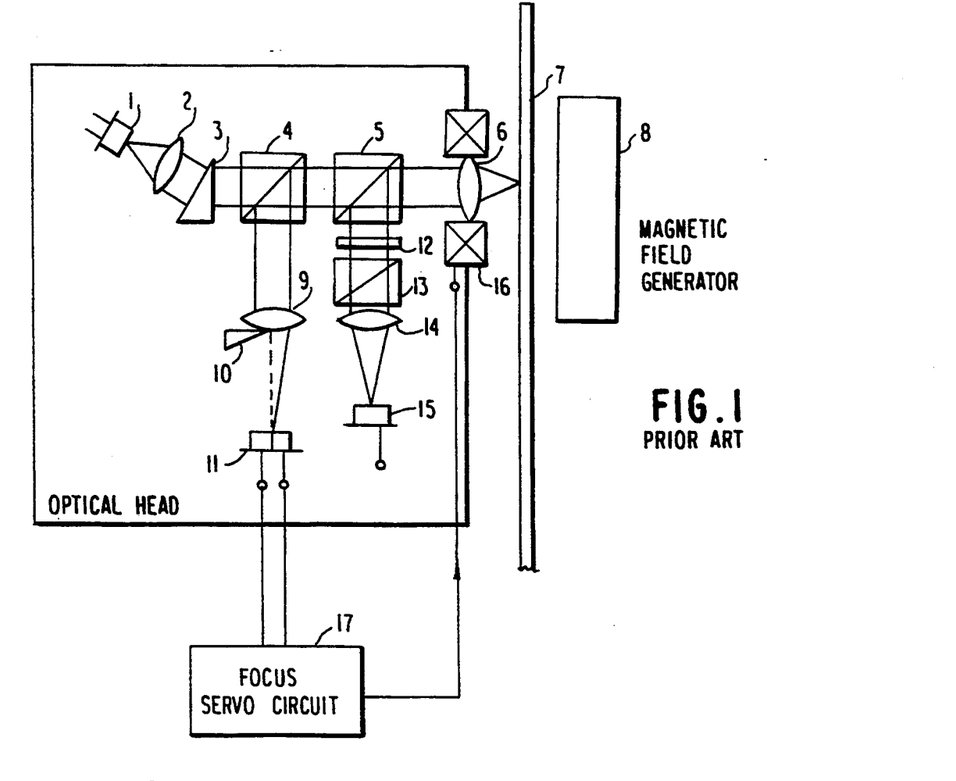
FIG. 1 illustrates the configuration of a prior art optical recording/reproducing apparatus.

Before describing the present invention, the usual configuration of an optical recording/reproduction apparatus will be described. In the optical recording/reproduction apparatus illustrated in FIG. 1, focus servo operation is performed by utilizing the knife edge method as an example. A beam emitted from a laser beam source 1 is converted by a collimate lens 2 and a shaping prism 3 into a beam of parallel uniformity having a round cross section. This beam, after having passed beam splitters 4 and 5, is focused by a focusing lens 6, provided on a lens actuator 16, on an optomagnetic disk 7. In a recording mode, a signal is recorded by combination of a magnetic field from a magnetic field generator 8 and the heat of the laser beam as the direction of magnetization. In the 10 reproduction mode, the rotation on the plane of optical polarization is detected by irradiating a laser beam.

A part of the reflected beam from the disk 7 is reflected by the beam splitter 5, and led to a signal detector 15 via a ½ wavelength plate 12 and a polarizing beam splitter 13. Meanwhile, the other part of the reflected beam, which is reflected by the beam splitter 4, is used for detecting a focus servo error signal. Thus this part of the reflected beam is led to a focus error signal detector 11 via a focusing lens 9 and a knife edge 10. The focus error signal detected by the detector 11 is entered into a focus servo circuit 17, which is thereby caused to drive the lens actuator 16 to accurately converge the laser beam. Incidentally, a tracking servo circuit is dispensed with in the illustration of FIG. 1.

Now will be described the present invention with reference to drawings.

Figure 2:
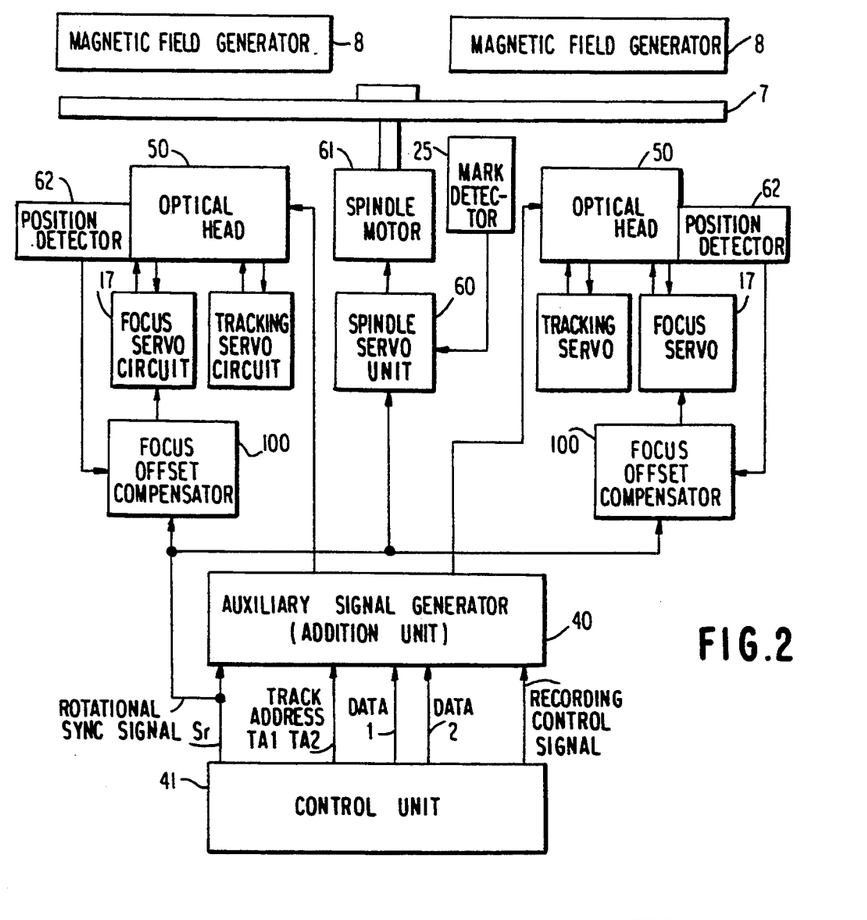
FIG. 2 is a block diagram of a preferred embodiment of the present invention.

FIG. 2 is a block diagram of an optical recording apparatus, which is a preferred embodiment of the invention. Referring to the figure, an optomagnetic disk 7 is fixed to and rotates with a spindle motor 61. The spindle motor 61 is driven by a spindle servo unit 60, which so performs control that a signal from a mark detector 25 for detecting an index mark put in advance on the disk 7 be identical in phase with a rotational sychromism signal Sr entered from outside, and rotates at 3600 rpm in this particular embodiment.

An optical head 50 and a magnetic field generator 8 are opposed to each other with the disk 7 in-between. The magnetic field generator 8, intended to provide the bias magnetic field needed for recording, consists of a permanent magnet.

The optical head 50, provided with an optical head position detector 62 for detecting the position of the optical head in the diametric direction of the disk 7, supplies an eight-bit digital signal having data naturally increasing from the innermost circumference toward the outermost circumference. The tolerance of the detected position is 32 tracks/bit (1 track=1.6 microns). The output of an automatic focus offset compensator 100 is connected to the focus servo circuit 17, which controls the focus of the optical head 50. To the automatic focus offset compensator 100 are inputted the focus error detection signal from the optical head 50, the optical head position signal from the optical head position detector 62 and the rotational synchronism signal Sr.

In this preferred embodiment, data to be recorded are divided between two channels for recording in order to raise the overall data transfer rate of the apparatus. Therefore, two sets each of the optical head 50, the focus servo circuit 17, the automatic focus offset compensator 100 and the optical head position detector 62, each paired constituents of the same configuration, are mounted.

Further, an auxiliary signal generator 40, into which the rotational synchronism signal Sr, track addresses TA1 and TA2, information signals DATA1 and DATA2, and a recording control signal are entered from a control unit 41, supplies auxiliary signals Sa1, Sb1, Sa2 and Sb2 to the two optical heads 50.

Figure 3:
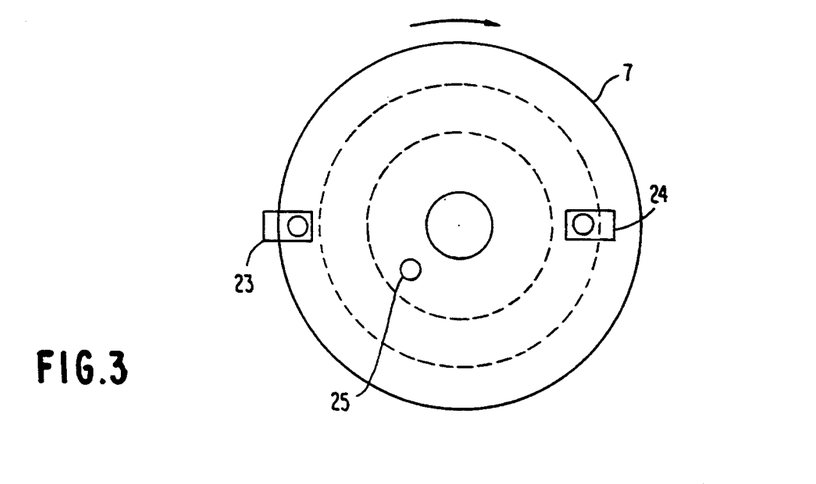
FIG. 3 illustrates the arrangement of an optical head and a mark detector in FIG. 2.

FIG. 3 illustrates the arrangement of optical heads 23 and 24 and the mark detector 25. In this figure, which shows a view of the apparatus from the above, the optomagnetic disk 7 is seen from the side reverse to the reproduction face. Underneath the disk 7 are arranged the optical heads 23 and 24 and the mark detector 25.

The optical heads 23 and 24 are arranged in positions 180° apart from each other with respect to the rotational center of the disk 7, and the mark detector 24 is in a position 45° ahead of the optical head 23. The rotational direction of the disk 7 is clockwise in this diagram.

Next will be described the auxiliary signal generator 40 with reference to FIG. 4. The auxiliary signal generator 40 is provided with an oscillating section 1 for generating auxiliary signals Sa1, Sb1, Sa2 and Sb2 of a rectangular shape, having different frequency components from one another, and a switching signal generating section 2 for generating a switching signal Ss in accordance with the rotational synchronism signal Sr. For a first channel, the auxiliary signal generator 40 is further provided with a switching section 3-1 for consecutively switching between the track address TA1, the auxiliary signals Sa1 and Sb1, and the information signal DATA1 and outputting them successively, and supplies its output signal So1 to a recording section 4-1 for recording on the disk 7. Similarly for a second channel, it is further provided with a switching section 3-2 for consecutively switching between the track address TA2, the auxiliary signals Sa2 and Sb2, and the information signal DATA2 and outputting them successively, and supplies its output signal So2 to a recording section 4-2 for recording on the disk 7. On the side of a recording area 1 are recorded the auxiliary signals Sa1 and Sb1, whose frequency components are 1 MHz and 20 MHz, respectively. On the side of a recording area 2 are recorded the auxiliary signals Sa2 and Sb2, whose frequency components are 1 MHz and 15 MHz, respectively.

Now will be described the operation of the auxiliary signal generator 40.

Figure 4:
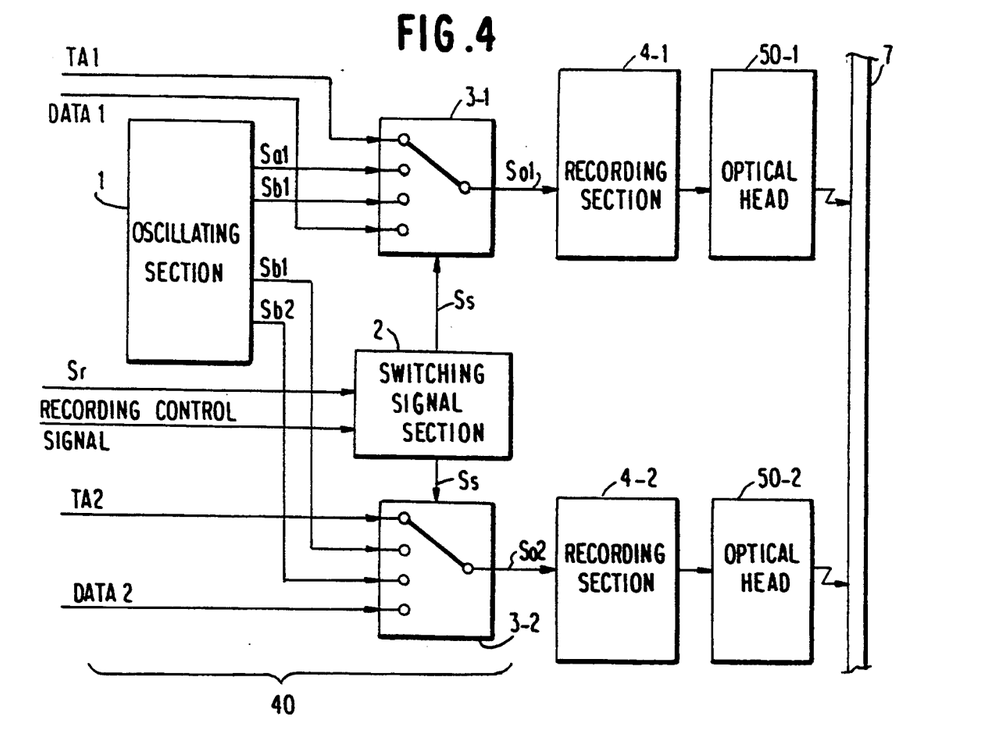
FIG. 4 illustrates the configuration of an auxiliary signal generator of FIG. 2.
Figure 5:
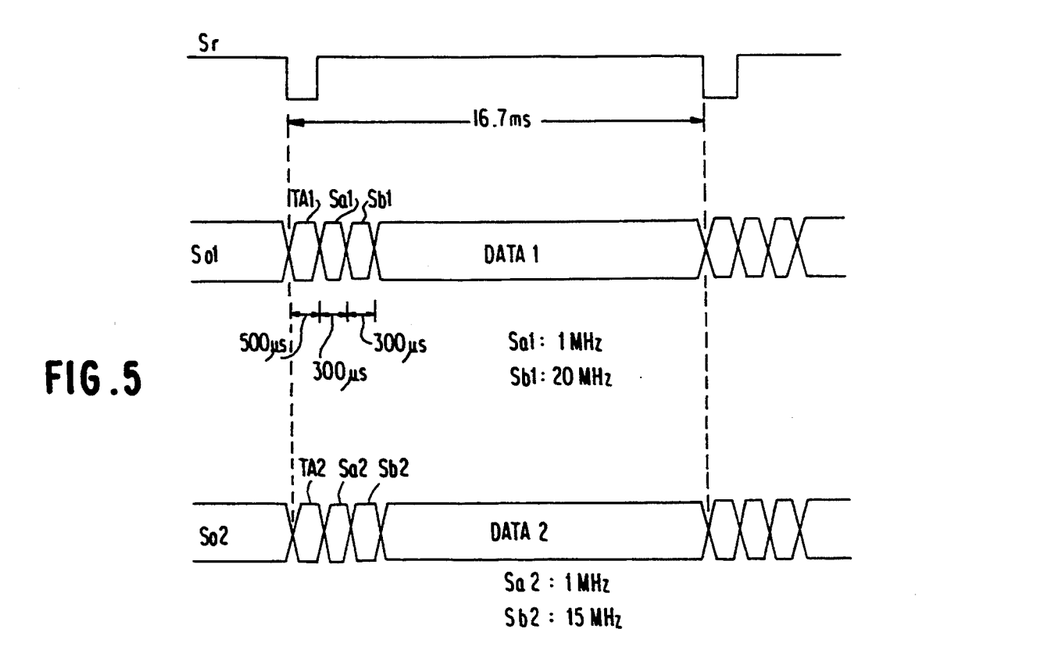
FIG. 5 illustrates output signals of an auxiliary signal generator.

FIG. 5 illustrates the output signals of the So1 and So2 of the switching sections 3-1 and 3-2, respectively, shown in FIG. 4. The rotational synchronism signal S4 is a reference signal supplied from outside. The output signal So1 of the first channel will be explained first. The switching signal generating section 2, after receiving the rotational synchronism signal Sr, sends to the switching section 3-1 such a switching signal Ss as will cause the track address TA1 to be sent out for 500 microseconds. Then, after sending out the auxiliary signals Sa1 and Sb1 consecutively for 300 microseconds each, it sends to the switching section 3-1 such another switching signal Ss as will cause the information signal DATA1 to be sent out. The switching section 3-1, receiving these switching signals Ss, consecutively supplies as its output signals So1 the track address TA1 for 500 microseconds, the auxiliary signals Sa1 and Sb1 for 300 microseconds each, and finally the information signal DATA1. Similarly, the output signals So2 of the second channel are generated by the switching section 3-2, receiving the switching signals Ss from the switching signal generating circuit 2, in a consecutive series of the track address TA2 for 500 microseconds, the auxiliary signals Sa2 and Sb2 for 300 microseconds each and, finally, the information signal DATA2. The output signals So1 and So2, which are in synchronism with the rotational synchronism signal SR, are outputted upon every rotation in the same format.

The recording section feeds an optical head 50-1 with a laser diode driving current matching the output signal So1 of the first channel. Light emission by a laser diode in the optical head 50-1 is turned on and off by this driving current, and the output signals So1 are recorded on the disk 7. Similarly, the output signals So2 are recorded on the disk 7 via the recording section 4-2 and a optical head 50-2.

Figure 6:
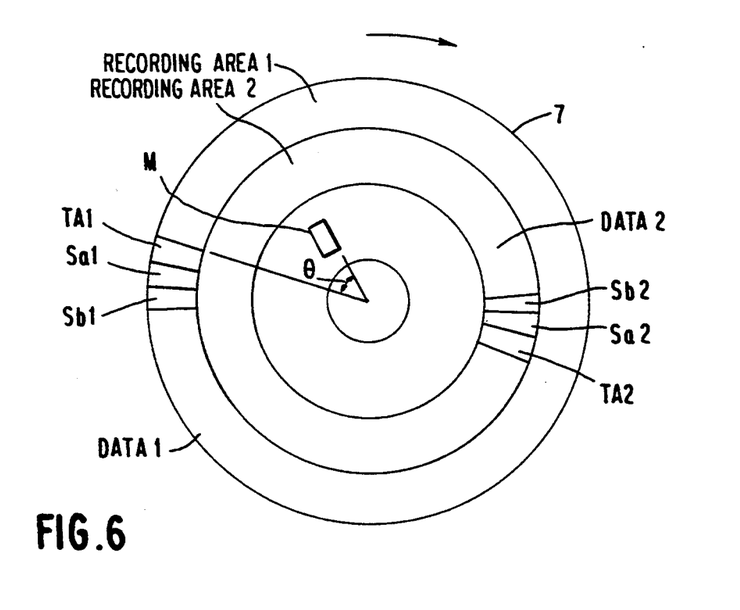
FIG. 6 shows a perspective view of an optical disk 7 shown in FIG. 2 from the side reverse to the reproduction face.

Now will be described the optomagnetic disk 7 with reference to FIG. 6, which shows a perspective from the side reverse to the recording/reproduction face. A spiral groove is provided at a 1.6-micron pitch on a glass substrate of 20 cm in diameter, and the spiral is directed from inside to outside in the rotational direction of this diagram, and a TbFeCo magnetic film is vapor-deposited over the groove. Since information signals are divided between two channels in this disk and enabled to be simultaneously recorded or reproduced on the two channels in order to raise the data transfer rate, the recording area of the disk 7 is concentrically bisected as indicated by a broken circle. The outer section of the recording area is referred to as the recording area 1, and the inner section, the recording area 2. The data transfer rates of the recording areas 1 and 2 are set at 62.6 Mbps and 5.10 Mbps, respectively, to equalize the bit length of the signals to be recorded on the respective inner circumferences of the two recording areas. In the area closer to the center of the disk, which is contained in neither of the recording areas 1 and 2, is provided an index mark M to indicate the rotational phase of the disk 7. The angle $\theta$ between the fore edge of the index mark M and track address TA1 is 45°.

Figure 7:
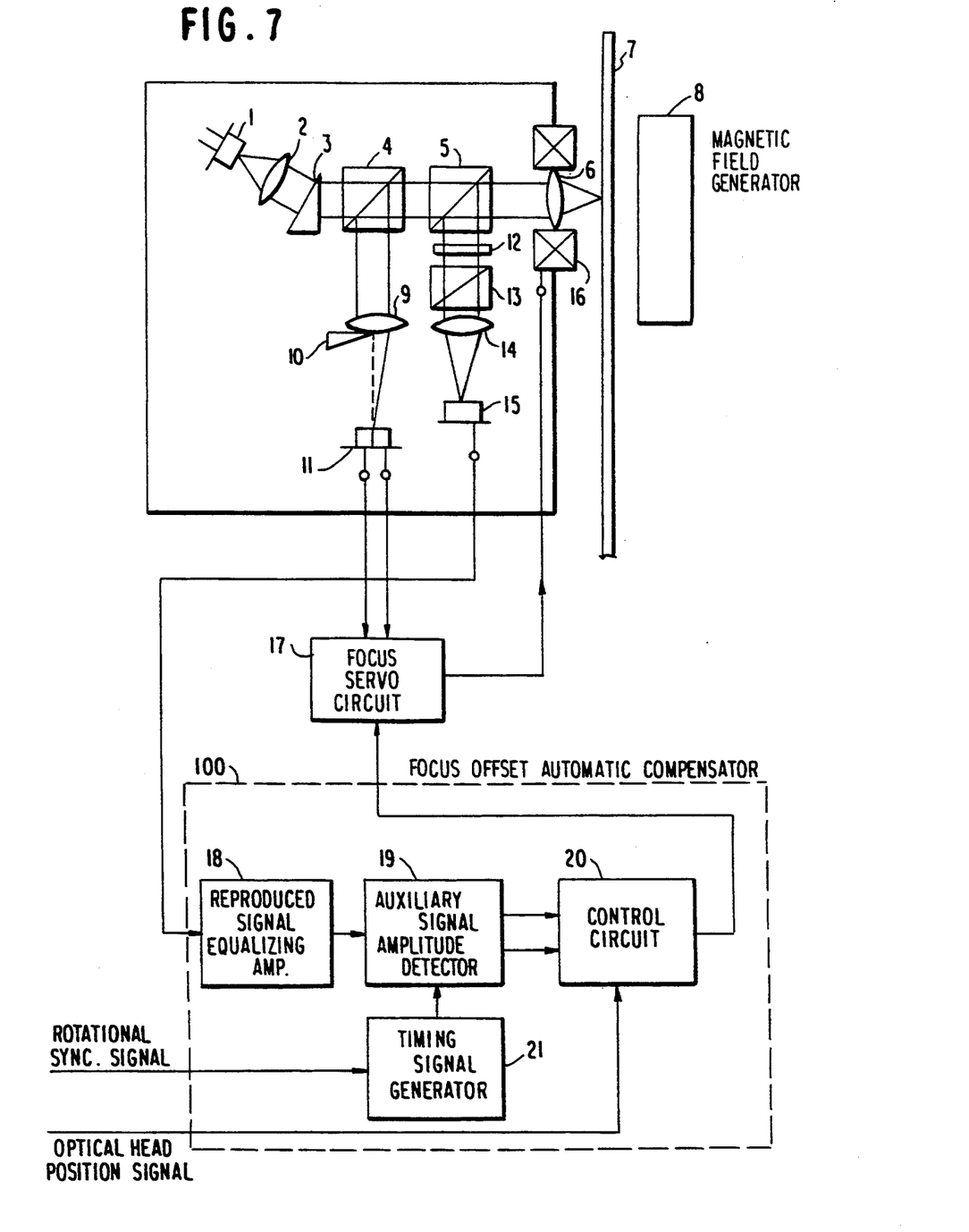
FIG. 7 illustrates the configuration of an automatic focus offset compensator according to the present invention.

Now will be described the automatic focus offset compensator 100 with respect to only one of the two lines with a view to simplifying the description. The automatic focus offset compensator 100 comprises a reproduced signal equalizing amplifier 18 for compensating the frequency characteristic and increasing the amplitude of reproduced signals; an auxiliary signal amplitude detector 19 for detecting the amplitudes of the auxiliary signals contained in the amplified reproduced signals; a control circuit 20 for supplying a focus offset control signal to the focus servo circuit 17 on the basis of the output of the detector 19; and a timing signal generator 21 for instructing the amplitude detection timing of the auxiliary amplitude detector 19.

Figure 8:
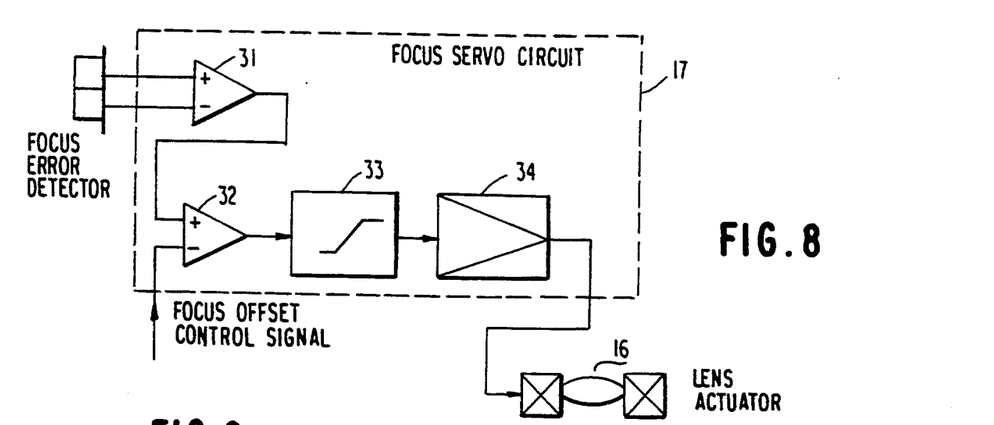
FIG. 8 illustrates the configuration of a focus servo circuit.

FIG. 8 illustrates the configuration of the focus servo circuit 17. The focus servo circuit 17 consists of a differential amplifier 31 connected to the focus error signal detector 11, another differential amplifier 32 for taking the difference between the differential amplifier 31 and the focus offset control signal, a lead-lag filter 33, and a drive amplifier 34, which supplies a drive current to the lens actuator 16.

Figure 12:
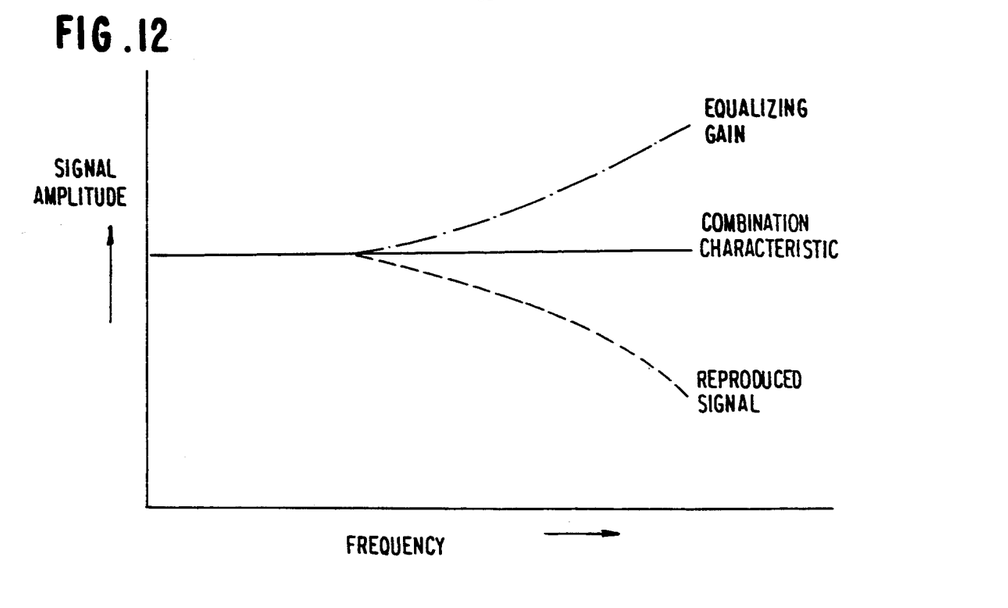
FIG. 12 is a diagram for explaining the characteristic of a reproduced signal equalizing amplifier.

The reproduced signal equalizing amplifier 18 compensates the frequency characteristic and increases the amplitude of reproduced signals, which are then entered into the auxiliary amplitude detector 19. The signal amplitude of a reproduced signal detector 15 decreases with a rise in frequency as shown in FIG. 12. This descending characteristic is compensated by an equalizer in the reproduced signal equalizing amplifier 18 to give a flat frequency characteristic.

Figure 9:
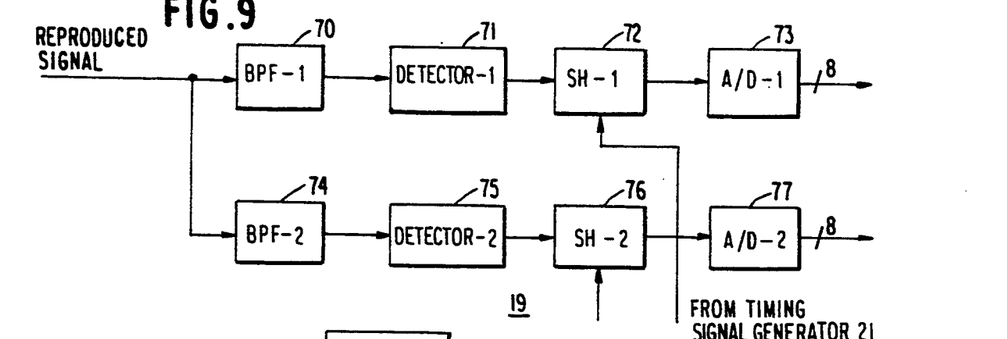
FIG. 9 illustrates the configuration of an auxiliary signal amplitude detector according to the present invention.
Figure 11:
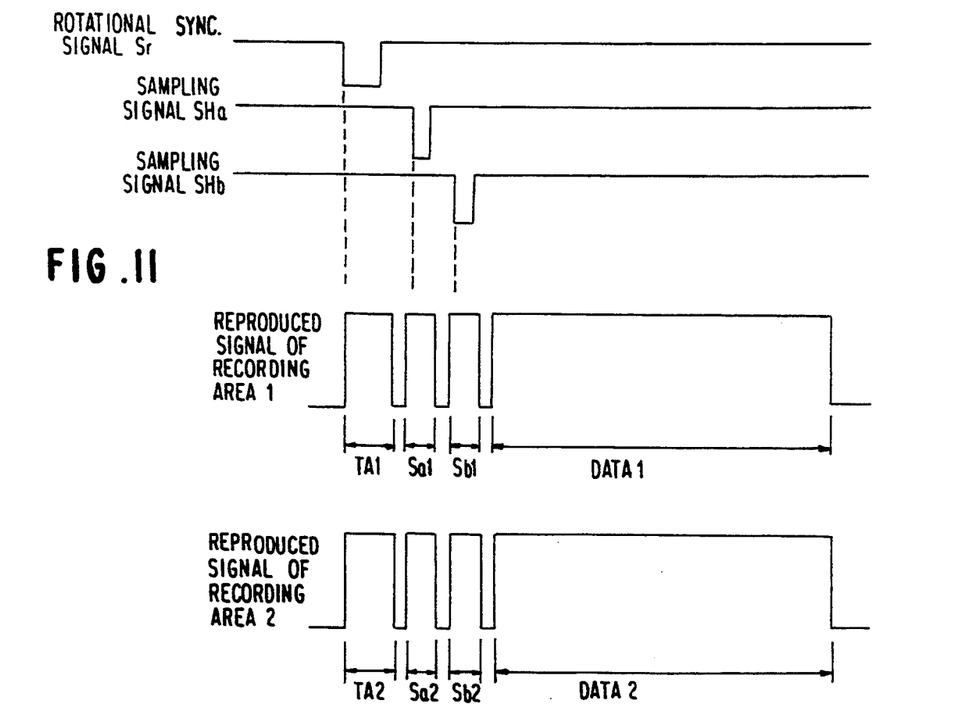
FIG. 11 illustrates the timings of an auxiliary signal and sample signals SHa and SHb.

FIG. 9 is a block diagram of the auxiliary signal amplitude detector 19. Reproduced signals from the reproduced signal equalizing amplifier 18 are entered into a band-pass filter-1 (B.P.F.-1) 70 and a band-pass filter-2 (B.P.F.-2) 74. The pass band of the B.P.F.-1 is so set as to pass only the auxiliary signal Sa1 contained in the reproduced signals, and that of the B.P.F.-2, only the auxiliary signal Sb1. The center pass frequency is 1 MHz for the B.P.F.-1 70, and 20 MHz for the B.P.F.-2 74. The output of the B.P.F.-1 70 undergoes average value detection by a detector-1 71 to be converted into a D.C. signal, which is entered into a sample hold circuit-1 (S/H-1) 72. Similarly, the output of the B.P.F.-2 74 undergoes average value detection by a detector-2 75 to be converted into a D.C. signal, which is entered into a sample hold circuit-2 (S/H-2) 76. To the S/H-1 72 is entered a sampling signal SHa from the timing signal generator 21, and to the S/H-2 76, another sampling signal SHb from the timing signal generator 21. The timings of these sampling signals SHa and SHb are shown in FIG. 11.

The timing signal generator 21 generates the sampling signals SHa and SHb indicating the timings, with reference to the rotational synchronism signal Sr, at which the auxiliary signals Sa1 and SB1 are respectively reproduced, and supply the sample signals SHa and SHb to the S/H-1 72 and the S/H-2 76, respectively.

Meanwhile, the S/H-1 72 samples the input signal at the timing of the reproduction of the auxiliary signal Sa1 according to the sample signal SHa, thereafter holds the sampled input signal and supplies it to an analog-to-digital converter (A/D-1) 73. Similarly, the S/H-2 76 sample-holds the auxiliary signal Sb1 according to the sample signal SHb, and supplies the sampled signal to another analog-to-digital converter (A/D-2) 77. The A/D-1 73 and the A/D-2 77, which are converters whose quantization number is 8 bits, send 8-bit digital signals, which are the results of conversion, to the control circuit 20.

Figure 10:
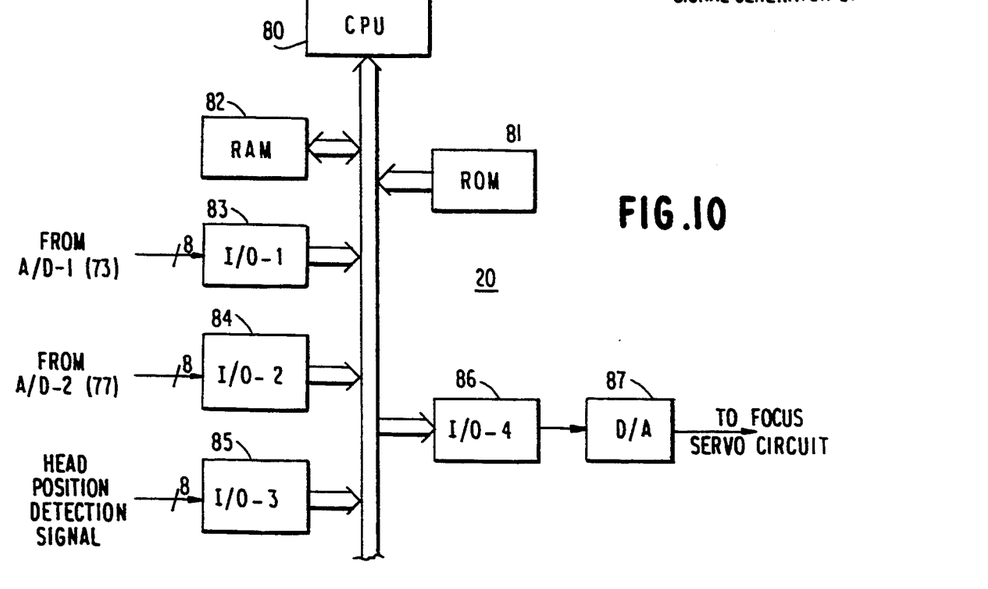
FIG. 10 illustrates the configuration of a control circuit according to the present invention.

The configuration of the control circuit 20 is illustrated in FIG. 10. In the control circuit 20, a CPU 80, a read-only memory (ROM) 81, a random access memory (RAM) 82, an input port (I/O-1) 83, another input port (I/O-2) 84, still another input port (I/O-3) 85 and an output port (I/O-4) 86 are connected together by an 8-bit data bus. The control program to be operated by the CPU 80 is written into the ROM 81. To the I/O-1 83, the I/O-2 84 and the I/O-3 85 are respectively inputted 10 signals from the A/D-1 73, the A/D-2 77 and the optical head position detector 62. Meanwhile the output of the I/O-4 86 is entered into a digital-to-analog converter (D/A) 87 and converted into an analog signal, which is supplied to the focus servo circuit 17 as the focus offset compensation signal.

Figure 13:
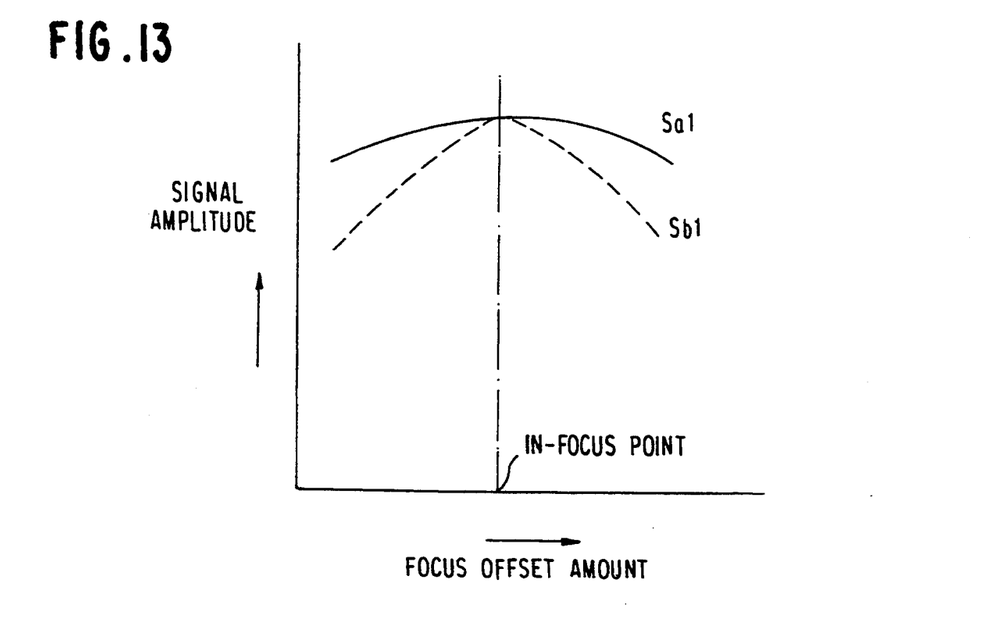
FIG. 13 illustrates the relationship between focus offset quantity and a signal amplitude.
Figure 14:
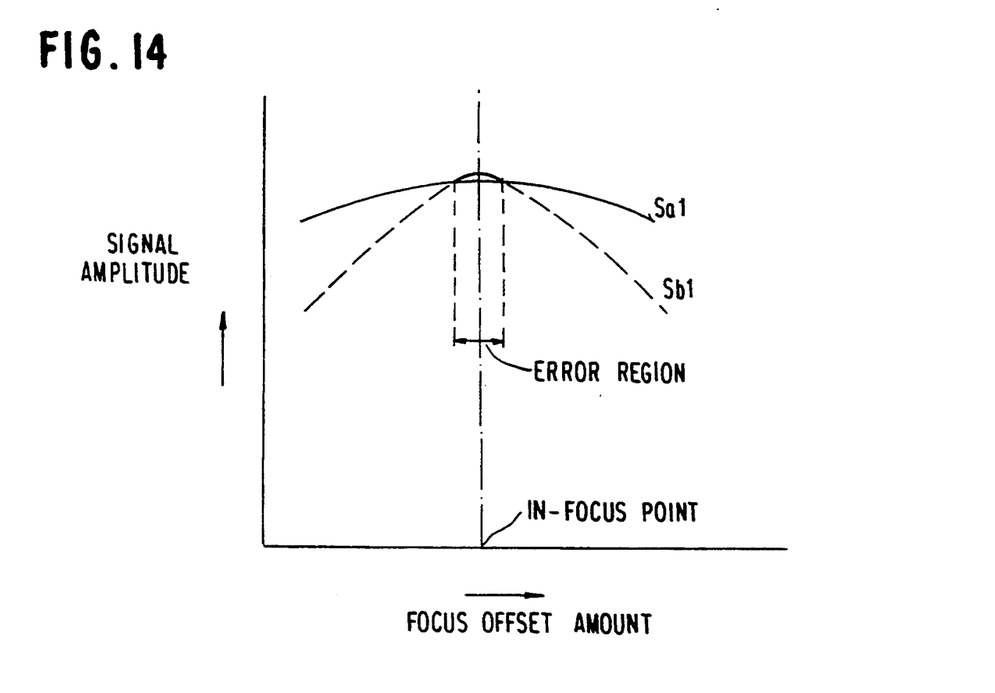
FIG. 14 illustrates amplitudes of the auxiliary signals Sa1 and Sb1 relative to the focus offset quantity.

Next will be described the operation. Taking note now of the reproduced signals on the side of the recording area 1, the frequency of the auxiliary signal Sa1 is lower than that of the auxiliary signal Sb1, and the variation of reproduced signal amplitude relative to the focus offset quantity of the optical head is such as is shown in FIG. 13. It is generally known to persons skilled in the art that the higher the signal frequency, the greater the variation of signal amplitude with a variation in focus offset quantity. In view of this, the signal amplitude relationship between the auxiliary signals Sa1 and Sb1 when in focus is set in advance as shown in FIG. 14. Thus, the output of the auxiliary signal amplitude detector 19 is so set that, when in focus, the amplitude of the auxiliary signal Sb1, which has a higher will be slightly greater than that of the auxiliary signal Sa1. Then, if the focus offset quantity is so controlled as to make the amplitude of the auxiliary signal Sa1 not greater than that of the auxiliary signal Sb1, adequate performance for practical use can be achieved around the in-focus point 10 even if some control error is involved.

Figure 15:
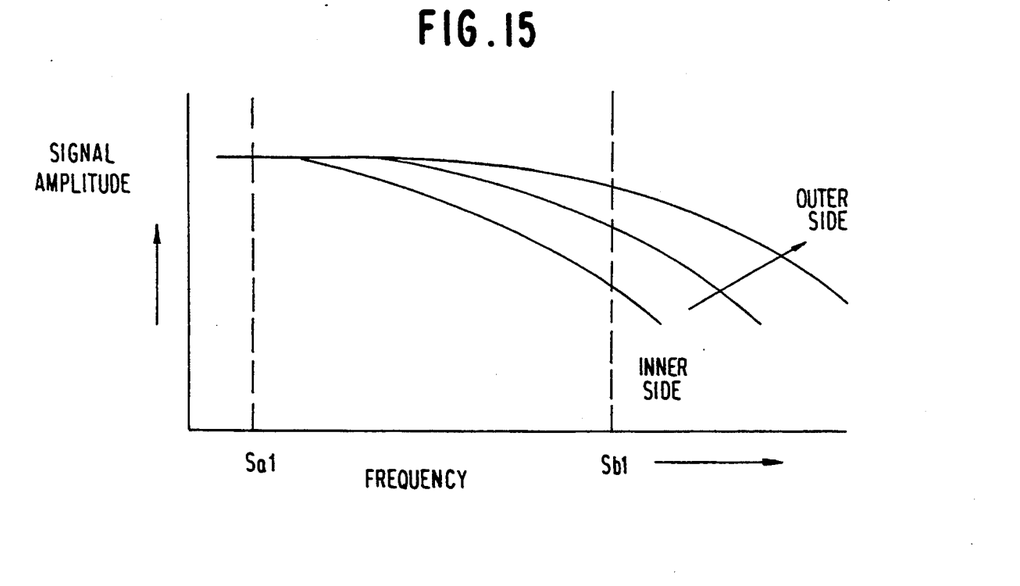
FIG. 15 illustrates the variation of the reproduced signal amplitude relative to the position of reproduction in the diametric direction of the photomagnetic disk.

FIG. 15 illustrates the variation of the reproduced signal amplitude relative to the position of reproduction in the diametric direction of the optomagnetic disk 7. Since the frequency of the auxiliary signal Sa1 is as low as 1 MHz in this preferred embodiment, the reproduced signal amplitude scarcely varies relative to the position of reproduction in the diametric direction. As the frequency of the auxiliary signal Sb1 is much higher, 20 MHz, however, the reproduced signal amplitude increases with a move from the inner side, where the linear velocity is lower, toward the outer side, where the linear velocity is higher. This is due to waveform interference which occurs as the recording wavelength on the medium face approaches the diameter of the laser beam for reproduction use, with which disk 7 is irradiated, on the medium surf at-. (as the recording frequency rises).

Figure 16:
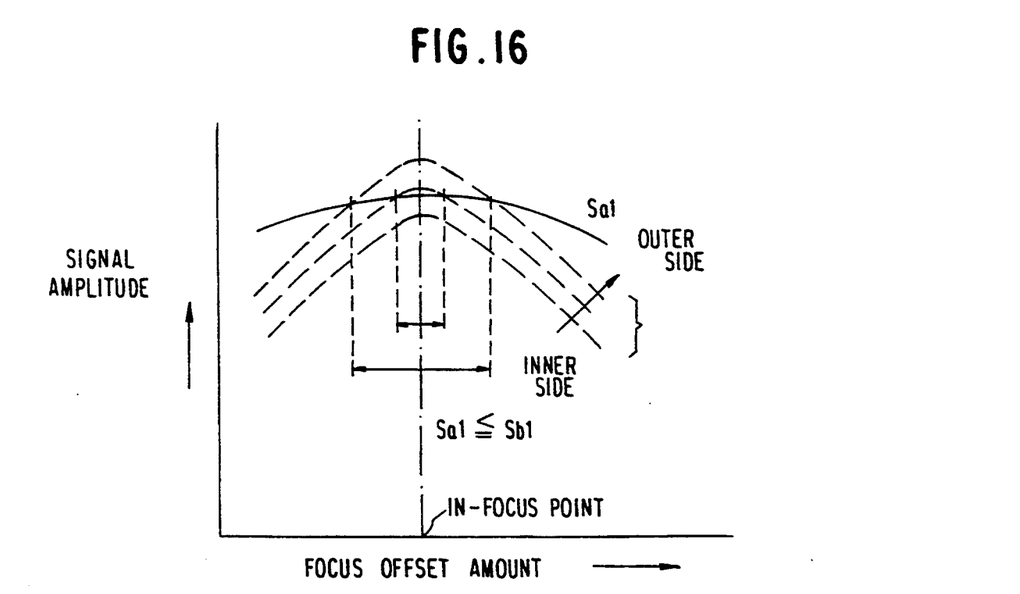
FIG. 16 illustrates the variation within the range of Sa1≦Sb1 relative to the position of reproduction in the diametric direction.

Now, this phenomenon changes the range of Sa1≦Sb1 relative to the position of reproduction in the diametric direction as shown in FIG. 16. Thus the compensation error of focus offset would increase toward the outer circumference. In order to solve this problem, in this preferred embodiment, the position of reproduction in the diametric position is detected by the optical head position detector 62, and the reproduced amplitude of the auxiliary signal Sb1 is corrected according to the result of this detection to keep the compensation error constant.

Figure 17:
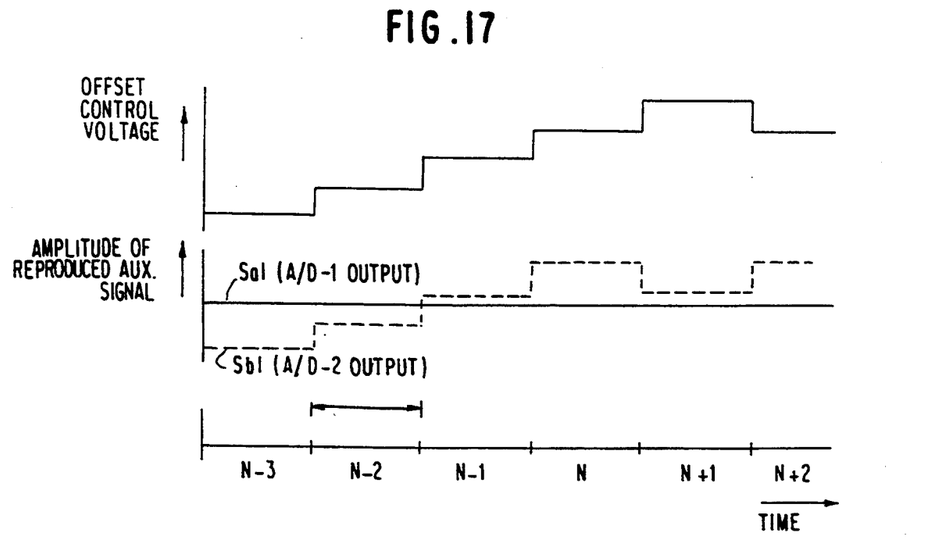
FIGS. 17 and 18 are diagrams for explaining a method to determine that the beam is in focus.
Figure 18:
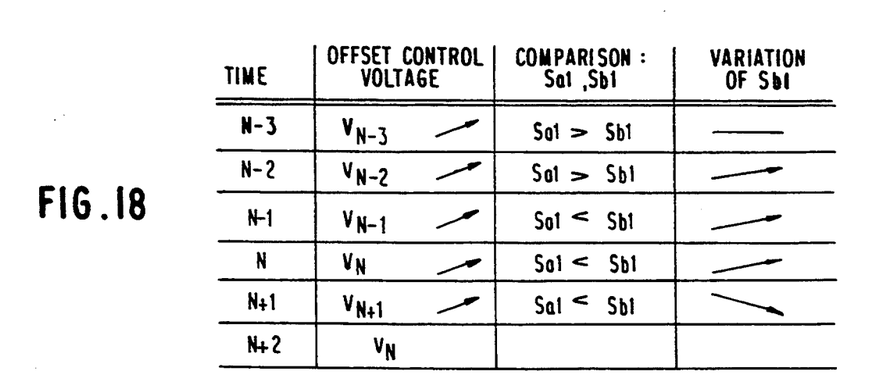

Next, with reference to FIGS. 17 and 18, it will be described how the in-focus point is determined. When the offset control voltage was changed from $V_{N-3}$ to $V_{N-2}$ at a point of time N−2, the amplitude of the auxiliary signal Sb1 widened in this case. Then, when the offset control voltage was further increased at a point of time N−1, there was established the relationship of Sa1<Sb1, and the amplitude of the auxiliary signal Sb1 also widened. The same held true at a point of time N, but, when The offset control voltage was further increased at a point of time N+1, the amplitude of the auxiliary signal Sb1 narrowed though the relationship of Sa1<Sb1 remained. It was judged that the in-focus point has been passed, and the control voltage $V_N$ of the step before was determined as the optimal value, at which the outputting is to be continued.

Figure 19:
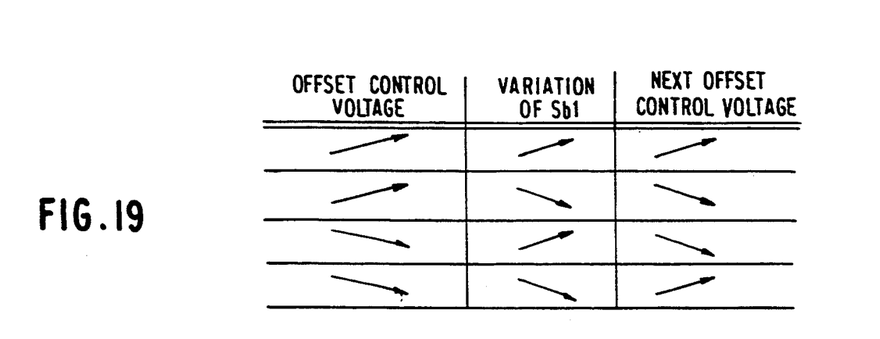
FIG. 19 illustrates a method to control the offset compensating voltage.

FIG. 19 shows the method to control the offset compensating voltage. The reproduced amplitude of the auxiliary signal Sb1 here is that after the correction of the amplitude according to the head position detection signal.

As hitherto described, the present invention, when recording information signals on an optical disk, records the information signals together with a plurality of auxiliary signals differing in frequency component from one another, and thereby makes it possible, when reproducing the information signals from the optical disk, to automatically compensate for changes in focus offset by detecting the amplitudes of these reproduced plural auxiliary signals. Therefore, the invention makes it possible to prevent, even if the optical head or the like of the optical reproducing apparatus is mechanically affected by a change in temperature or humidity or by vibration, the error rate of reproduced signals from being deteriorated or the tracking servo from being dislocated, and thereby to achieve stable servo performance.

What is claimed is:

1. An optical reproducing apparatus for reproducing an information signal for an optical disk by irradiating a laser beam onto an optical disk, comprising:

means for focusing said laser beam on said optical disk, said optical disk storing a plurality of auxiliary signals having predetermined different frequency components;

means for detecting reproducing signal levels of said predetermined different frequency components of said plurality of auxiliary signals reproduced from said optical disk, said means for detecting comprising a plurality of bandpass filters for extracting said predetermined different frequency components; and control means for controlling said focusing means such that said reproduced signal levels of said predetermined different frequency components are in a predetermined relationship.

2. An optical reproducing apparatus as claimed in claim 1, said control means comprising:

means for comparing said reproduced signal levels of said predetermined different frequency components of said reproduced auxiliary signals; and means for generating a control signal to said focusing means in response to a comparison result of said comparing means.

3. An optical reproducing apparatus as claimed in claim 1, wherein said predetermined relationship is substantial equality between said reproduced signal levels of said predetermined different frequency components of said plurality of auxiliary signals.

4. An optical reproducing apparatus as claimed in claim 1, wherein said plurality of auxiliary signals are sequentially recorded on a recording track of said optical disk; and said means for detecting reproduced signal levels further comprises:

means for sample-holding outputs of said plurality of bandpass filters at respective timings associated with recording positions of said plurality of auxiliary signals on said optical disk.

* * * * *

UNITED STATES PATENT AND TRADEMARK OFFICE
CERTIFICATE OF CORRECTION

PATENT NO. : 5,432,765
DATED : Jul. 11, 1995
INVENTOR(S) : Toru Sekiguchi, et al It is certified that error appears in the above-indentified patent and that said Letters Patent is hereby corrected as shown below:

Col. 8, line 4, delete "10"

Signed and Sealed this

Seventh Day of November, 1995

Attest:

BRUCE LEHMAN

Attesting Officer          Commissioner of Patents and Trademarks